(12) United States Patent
Crolley (10) Patent No.: US 9,154,471 B2
(45) Date of Patent: Oct. 6, 2015

(54) METHOD AND APPARATUS FOR UNIFIED ENCRYPTED MESSAGING

(71) Applicant: AT&T Intellectual Property I, L.P., Atlanta, GA (US)

(72) Inventor: Wayne Crolley, Bryant, AR (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/090,736

(22) Filed: Nov. 26, 2013

(65) Prior Publication Data

US 2015/0149762 A1 May 28, 2015

(51) Int. Cl.
*H04L 9/00* (2006.01)
*H04L 29/06* (2006.01)

(52) U.S. Cl.
CPC .................................. *H04L 63/0428* (2013.01)

(58) Field of Classification Search
CPC ... H04L 63/0428; H04L 63/0442; H04L 9/08; H04L 9/00; H04N 7/1675
USPC ......................................................... 713/150
See application file for complete search history.

(56) References Cited

U.S. PATENT DOCUMENTS

| | | | |
|---|---|---|---|
| 6,026,165 A | 2/2000 | Marino et al. | |
| 6,167,137 A | 12/2000 | Marino et al. | |
| 6,226,742 B1 | 5/2001 | Jabukowski et al. | |
| 6,922,785 B1 | 7/2005 | Brewer et al. | |
| 6,996,233 B2 | 2/2006 | Brokenshire et al. | |
| 7,308,477 B1 | 12/2007 | Gress et al. | |
| 7,500,105 B2 | 3/2009 | Schmit | |
| 7,725,715 B2 | 5/2010 | Veiseh et al. | |
| 7,773,699 B2 | 8/2010 | Jia et al. | |
| 7,861,083 B2 | 12/2010 | Schmit | |
| 8,205,127 B2 | 6/2012 | Wan et al. | |
| 8,321,675 B2 | 11/2012 | Rogaway | |
| 8,495,456 B2 | 7/2013 | Lo | |

(Continued)

FOREIGN PATENT DOCUMENTS

| | | |
|---|---|---|
| CA | 2139081 | 2/1999 |
| CA | 2495018 | 2/2004 |
| EP | 0906677 A2 | 4/1999 |
| WO | WO 2009000209 A1 | 12/2008 |

OTHER PUBLICATIONS

Vasudevan, Rangarajan A. et al., A Novel Multipath Approach to Security in Mobile Ad Hoc Networks (MANETs); http://arxiv.org/ftp/arxiv/papers/1112/1112.2128.pdf, 2011,4 pp.

(Continued)

*Primary Examiner* — Baotran N To
(74) *Attorney, Agent, or Firm* — Hanley, Flight & Zimmerman, LLC (57) ABSTRACT

A unified encrypted messaging system transmits messages from a first computer to a second computer by dividing the encrypted message into a plurality of encrypted message fragments. A first portion of the plurality of encrypted message fragments is transmitted via a first protocol and a second portion of the plurality of encrypted message fragments is sent via a second protocol. The first portion may be sent via a first device and the second portion may be sent via a second device where the first device is different from the second device. The dividing the encrypted message may include adding a message identifier and fragment identifier to each of the plurality of encrypted message fragments to facilitate reassembly of the encrypted message upon receipt.

17 Claims, 5 Drawing Sheets

(56) References Cited

U.S. PATENT DOCUMENTS

| | | |
|---|---|---|
| 8,503,621 B2 | 8/2013 | Patel et al. |
| 2002/0048364 A1 | 4/2002 | Gligor et al. |
| 2002/0080888 A1* | 6/2002 | Shu et al. .................. 375/295 |
| 2002/0138728 A1 | 9/2002 | Parfenov et al. |
| 2009/0138714 A1 | 5/2009 | Matsushita et al. |
| 2010/0008509 A1 | 1/2010 | Matsushita et al. |
| 2014/0122876 A1* | 5/2014 | Johnson et al. ............... 713/168 |

OTHER PUBLICATIONS

Berman, Vladimir, Enhancing Data Security in Mobile Ad Hoc Networks via Multipath Routing and Directional Transmission; Dissertation, University of California, 2005, http://www.cs.ucdavis.edu/research/tech-reports/2005/CSE-2005-05.pdf, 2005, 100 pp.

* cited by examiner

METHOD AND APPARATUS FOR UNIFIED ENCRYPTED MESSAGING

BACKGROUND

The present disclosure relates generally to telecommunications, and more particularly to unified encrypted messaging.

When messages are transmitted between two parties, there is a chance that the messages may be intercepted and read by unauthorized individuals electronically eavesdropping on communications. Encryption may be used to prevent unauthorized individuals from reading messages. A sending party can encrypt a message before it is sent to a receiving party and the receiving party can decrypt the message after receipt. Encryption attempts to prevent unauthorized individuals electronically eavesdropping on communications from reading messages. However, unauthorized individuals who intercept messages can often decrypt and read the messages. Instead of, or in addition to, encryption sending and receiving parties can transmit messages over a protected communication medium. The protection can take various forms. For example, a communication medium, such as a wire, can be placed so that it is difficult to locate or physically access. However, unauthorized individuals may still find a way to access the communication medium to eavesdrop on communications between two parties. As such, encryption and protection of a communication medium may not provide a desired level of security for the transmission of messages.

SUMMARY

In one embodiment, a method for unified encrypted messaging comprises dividing an encrypted message into a plurality of encrypted message fragments. A first portion of the plurality of encrypted message fragments is transmitted via a first protocol. A second portion of the plurality of encrypted fragments is transmitted via a second protocol. In one embodiment, a first portion of the plurality of encrypted message fragments is transmitted via a first protocol via a first device and the second portion of the plurality of encrypted message fragments is transmitted via a second protocol via a second device. In one embodiment, the first device being different from the second device. In one embodiment, the first protocol and first device are associated with a first medium and the second protocol and second device are associated with a second medium.

In one embodiment, the dividing of an encrypted message into a plurality of encrypted message fragments further comprises adding a message identifier and a fragment identifier to each of the plurality of encrypted message fragments. The method may further comprise receiving the first portion of the plurality of encrypted message fragments via the first protocol, receiving the second portion of the plurality of encrypted message fragments via the second protocol, and assembling the encrypted message based on the first portion of the plurality of encrypted message fragments and the second portion of the plurality of message fragments to generate a reassembled encrypted message. In one embodiment, the assembling of the encrypted message is further based on the message identifier and fragment identifier in each of the plurality of encrypted message fragments. In one embodiment, the assembling the encrypted message further comprises removing the message identifier and fragment identifier from each of the plurality of encrypted message fragments.

In one embodiment, each fragment is formatted based on a protocol via which the fragment is to be sent. In one embodiment, the encrypted message is divided into a number of fragments based on a number of devices from which the fragment is to be sent and the number of fragments each device is to send.

An apparatus and computer readable medium for unified encrypted messaging are also described.

DETAILED DESCRIPTION

Figure 1A:
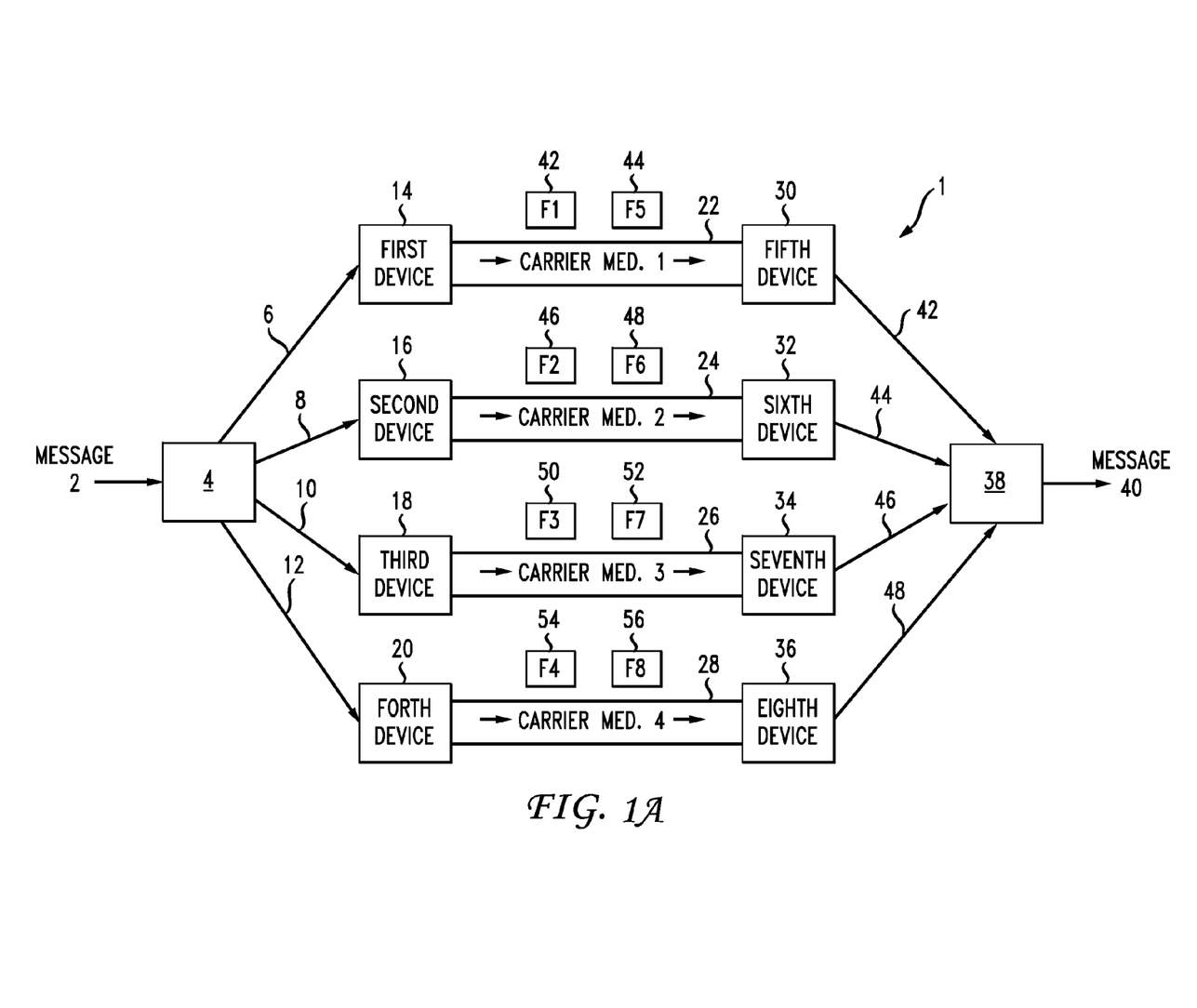
FIG. 1A depicts a system for unified encrypted messaging according to one embodiment.

FIG. 1A depicts a system 1 for unified encrypted messaging according to one embodiment. FIG. 1A depicts a generic system while FIG. 1B, described below, provides a more specific example specifying the devices used.

As shown in FIG. 1A, message 2 is received at personal computer (PC) 4 where it is encrypted. After encryption, message 2 is divided into a plurality of encrypted message fragments for transmission via multiple devices. The number of the plurality of fragments, in one embodiment, is based on the number of devices from which the plurality of fragments will be transmitted and the number of fragments to be transmitted from each device. After encryption and division of the message into a plurality of encrypted fragments, each of the plurality of fragments is formatted based on the type of device from which the fragment will be transmitted, the protocol that will be used for transmission, and the carrier medium via which the fragment will be transmitted. For example, fragments F1 42 and F5 44 may be formatted based on first device 14, carrier medium 1 22, and the protocol associated with first device 14 and carrier medium 1 22. Fragments F2, F6, F3, F7, F4, and F8 are similarly formatted based on the respective devices and protocols via which the fragments will be transmitted.

Each of the plurality of fragments is then transmitted from PC 4 to one of first device 14, second device 16, third device 18, and fourth device 20 via communication links 6, 8, 10, and 12 respectively. Communications links 6, 8, 10, and 11 may be any kind of medium and protocol capable of transmitting information from PC 4 to one of devices 14, 16, 18, and 20. For example, if a device is a Bluetooth capable cell phone, PC 104 can communicate wirelessly via the Bluetooth standard.

In one embodiment, formatting of fragments for a specific protocol and carrier medium is performed by the device from which the fragments will be transmitted. Each device then transmits the fragments it receives via a carrier medium using a specific protocol. For example, if first device 14 is a cell phone and carrier medium 1 22 is a wireless connection to fifth device 30 (also a cell phone in this example), fragments F1 42 and F5 44 are transmitted wirelessly via carrier medium 1 22 to fifth device 30. Fragments F1 42 and F5 44 are transmitted using a specific protocol. For example, since first device 14 and fifth device 30 are cell phones, fragments F1 42 and F5 44 may be transmitted using a text message protocol. Alternatively, fragments F1 42 and F5 44 may be transmitted via voice or other protocol supported by both first device 14 and fifth device 30.

Similarly, fragments are transmitted from devices in communication with PC 4 to devices in communication with PC 38 via other carrier mediums and protocols. For example, fragments F2 46 and F6 48 are transmitted from second device 16 to sixth device 32 via carrier medium 2 using a specific protocol. Carrier mediums may be any type of communication medium such as wired or wireless. Protocols used to transmit fragments may be any type of protocol such as text message, email, voice, etc.

Fragments received at fifth device 30, sixth device 32, seventh device 34, and eighth device 36 are transmitted to PC 38 via respective communication links 42, 44, 46, 48 in a manner similar to transmission of fragments from PC 4 to first device 14, second device 16, third device 18, and fourth device 20. PC 38 then reassembles the fragments and decrypts the received message before transmitting message 40 to a user identified by the message.

Figure 1B:
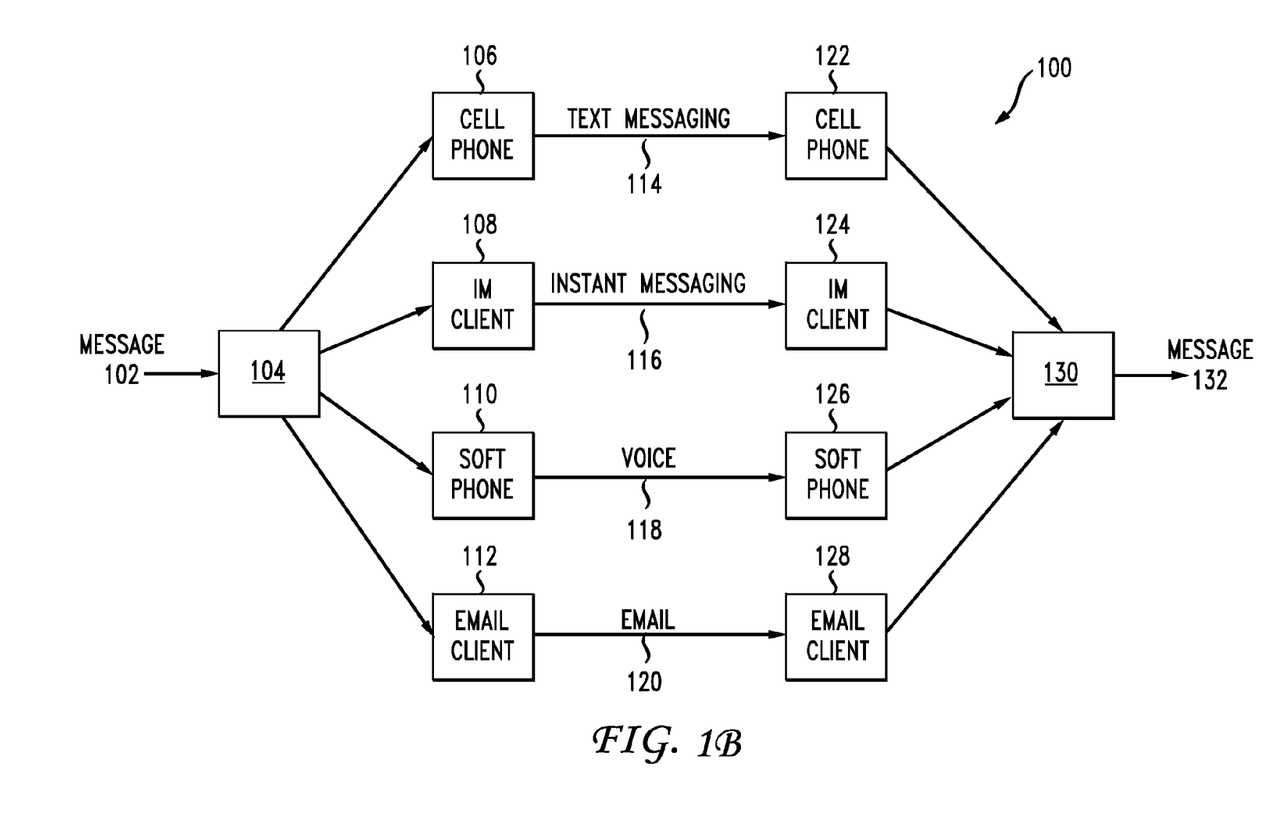
FIG. 1B depicts a system for unified encrypted messaging according to another embodiment.

FIG. 1B depicts an exemplary system 100 for unified encrypted messaging according to one embodiment. Message 102 is received at personal computer (PC) 104 where message 102 is encrypted. After encryption, message 102 is divided into a plurality of encrypted message fragments. Portions of the plurality of encrypted message fragments are selected and formatted for transmission via cell phone 106, instant messaging (IM) client 108, soft phone 110, and email client 112. Each portion of the plurality of encrypted message fragments is transmitted via a respective carrier medium and associated communication protocol. As shown in FIG. 1 cell phone 106 transmits wirelessly using a wireless medium 114 via a text messaging protocol to cell phone 122. IM client 108 transmits via a wired connection 116 using an instant messaging protocol to IM client 124, soft phone 110 transmits messages over wire 118 via voice protocol to soft phone 126, and email client 112 transmits messages over wire 120 via email protocol to email client 128. Each portion of the plurality of message fragments received by cell phone 122, IM client 124, soft phone 126, and email client 128 are then transmitted to PC 130 where message 132 is assembled based on the plurality of message fragments.

PC 104 and 130 may be any type of computer such as a desktop, laptop, handheld computer, tablet, etc. PC 104 is in communication with cell phone 106, IM client 108, soft phone 110, and email client 112 via various communication protocols, such as Bluetooth, IP protocol, etc.) and mediums such as wired or wireless. PC 130 is similarly in communication with cell phone 122, IM client 124, soft phone 126, and email client 128 via various communication protocols and mediums. Cell phones 106, 122 may be any type of phone such as a mobile phone or smart phone. IM clients 108, 124 may be any type of instant messaging or chat application. IM client 108, as shown in FIG. 1, operates on a computer separate from PC 104. In one embodiment, IM client 108 may operate on PC 104. Similarly, IM client 124 may operate on PC 130 or a separate computer. Soft phones 110, 126 may be any type of voice communication program (e.g., VoIP via a computer). Soft phone 110 is shown operating on a computer separate from PC 104. In one embodiment, soft phone 110 may operate on PC 104. Similarly, soft phone 126 may operate on PC 130 or a separate computer. Email clients 112, 128 may be any type of email program and is shown operating on a computer separate from PC 104. In one embodiment, email client 112 may operate on PC 104. Similarly, email client 128 may operate on PC 104 or a separate computer.

Figure 2:
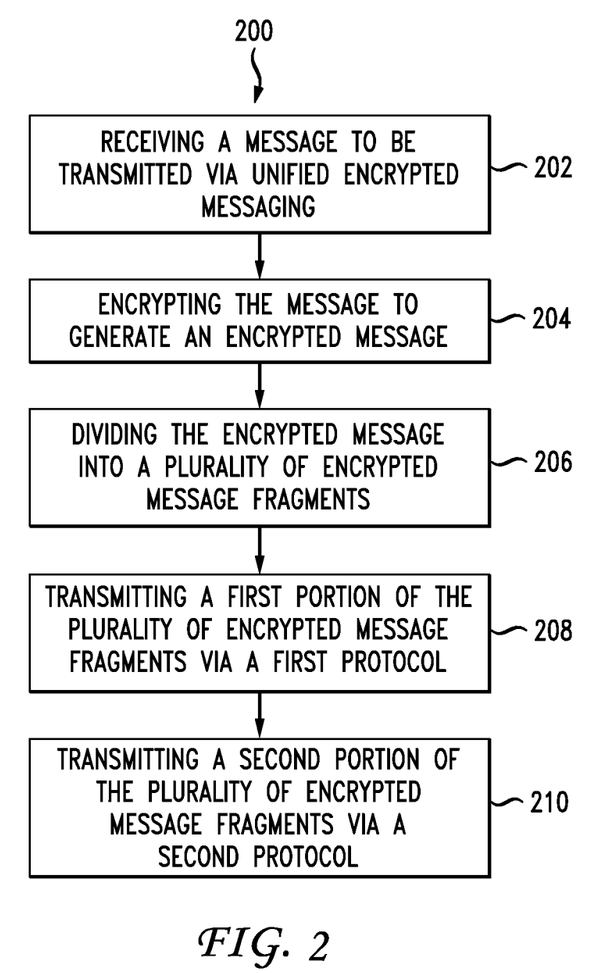
FIG. 2 is a flowchart depicting a method of unified encrypted messaging according to one embodiment in which a messages is encrypted and divided into a plurality of encrypted message fragments.

FIG. 2 depicts a flow chart of method 200 for encryption and transmission of messages according to one embodiment. At step 202, a message to be transmitted via unified encrypted messaging is received from a user at PC 104. In one embodiment, message 102 shown in FIG. 1 is created by a user via PC 104. For example, a user may create a message using a word processing program, email program, or other program suitable for creation of a message. In other embodiments, a user may transmit a message to PC 104 for encryption and transmission. Message 102 may be a message comprising only text or a multimedia message comprising text, audio, video, etc. In one embodiment, message 102 is created on a device other than PC 104 and the message is transmitted or otherwise delivered to PC 104 with an indication that the message is to be transmitted via unified encrypted messaging.

At step 204, message 102 is encrypted to generate an encrypted message. Message 102 can be encrypted using any type of encryption algorithm. Encryption algorithms or techniques that produce encrypted messages that are easily divided into a plurality of fragments may reduce processing power required to perform method 200.

At step 206, the encrypted message is divided into a plurality of encrypted message fragments. The number of the plurality of fragments, in one embodiment, is based on the number of devices and/or communication mediums via which the message will be transmitted. For example, if the message is to be transmitted from two different devices, the message, in one embodiment, is divided into at least two fragments. Similarly, if the message is to be transmitted from four different devices, the message is divided into at least four fragments. In one embodiment, the message is divided into a plurality of fragments based on the number of devices from which the message is to be transmitted and a minimum number of message fragments each device is to transmit. For example, if a message is to be sent from five devices and each device is to send two fragments, the message would be divided into 10 fragments. In the method 200 shown in FIG. 2, the message is divided into two encrypted message fragments for ease of understanding.

At step 208, a first portion of the plurality of encrypted message fragments is transmitted via a first protocol. For example, with respect to FIG. 1, the first portion of the plurality of encrypted message fragments may be transmitted from PC 104 to cell phone 106 where the first portion of the plurality of encrypted message fragments is transmitted via wireless medium 114 using a text messaging protocol to cell phone 122.

At step 210, a second portion of the plurality of encrypted message fragments is transmitted via a second protocol. For example, with respect to FIG. 1, the second portion of the plurality of encrypted message fragments may be transmitted from PC 104 to IM client 108 where the second portion of the plurality of encrypted message fragments is transmitted via wired medium 118 using an instant messaging protocol.

In one embodiment, each of the plurality of message fragments are formatted based on the device, carrier medium, and protocol via which each of the plurality of message fragments is to be transmitted. For example, a particular fragment of the plurality of message fragments may be formatted into a text message to be sent from cell phone 106 and wireless medium 114 using a text messaging protocol. Since each type of device and carrier medium may require different formatting for transmission, each of the plurality message fragments may be formatted based on how a particular message fragment is to be transmitted.

Figure 3:
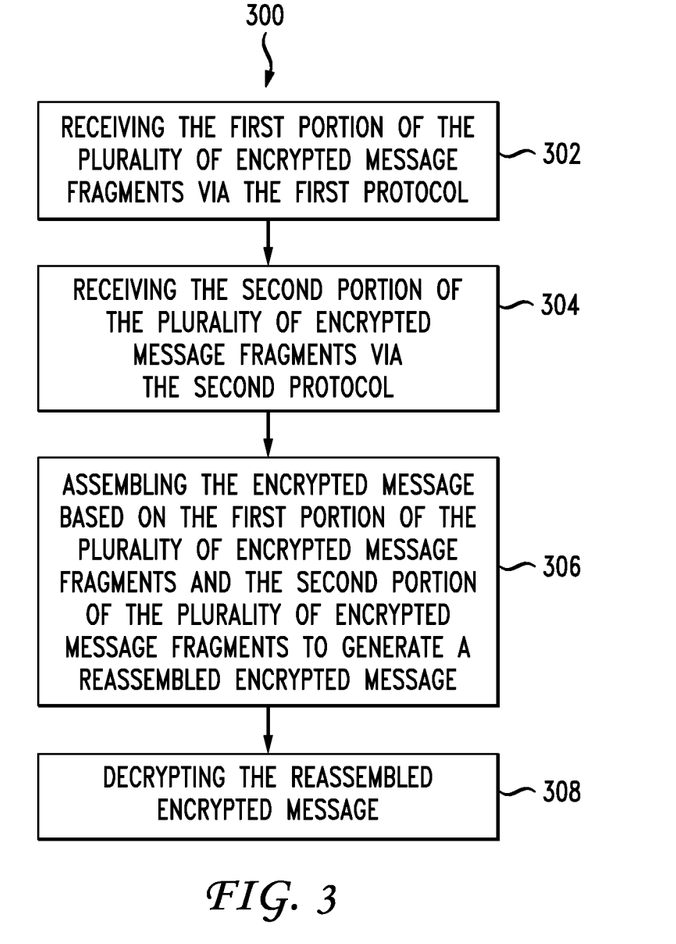
FIG. 3 is a flowchart depicting a method of unified encrypted messaging according to one embodiment in which a plurality of encrypted message fragments are received and used to assemble an encrypted message.

FIG. 3 depicts a flow chart of method 300 for receiving, reassembling, and decrypting a message encrypted and transmitted as a plurality of encrypted message fragments according to the method shown in FIG. 2. At step 302, the first portion of the plurality of encrypted message fragments is received via the first protocol. For example, as shown in FIG. 1, a first portion of the plurality of encrypted message fragments transmitted from cell phone 106 via wireless medium 114 using a text messaging protocol is received by cell phone 122 which transmits the first portion to PC 130.

At step 304 the second portion of the plurality of encrypted message fragments is received via the second protocol. For example, as shown in FIG. 1, the second portion of the plurality of encrypted message fragments transmitted from IM client 108 via wired medium 116 using an instant messaging protocol is received by IM client 124 which transmits the second portion to PC 130.

At step 306, after receipt of the first and second portions at PC 208, a reassembled encrypted message is generated by assembling the encrypted message based on the first portion of the plurality of encrypted message fragments and the second portion of the plurality of encrypted message fragments. At step 308, the reassembled encrypted message is decrypted and is then ready to be accessed by a user via PC 130.

In one embodiment, step 206 of FIG. 2 further comprises generating and adding identifiers to each of the plurality of encrypted message fragments. In one embodiment, a message identifier is added to each fragment to identify a particular message to which all of the plurality of encrypted message fragments belong. The message identifier, in one embodiment, may be a numeric identifier or an alpha-numeric identifier. In other embodiments, other types of message identifiers may be used. In one embodiment, a fragment identifier is also added to each of the plurality of encrypted message fragments. The fragment identifier identifies each of the plurality of encrypted message fragments and may be a numeric, alpha-numeric, or other type of identifier. Message identifiers and fragment identifiers are used by a receiving PC, such as PC 130 shown in FIG. 1, to reassemble an encrypted message based on the plurality of encrypted message fragments. In one embodiment, step 306 of FIG. 3 further comprises removing message identifiers and fragment identifiers during assembly of the encrypted message to generate the reassembled encrypted message.

As shown in FIG. 1, transmissions between PC 104 and PC 130 can occur over different devices, protocols, and carrier mediums. As shown in FIG. 1, transmissions between PC 104 and PC 130 occur via wireless carrier medium 114 using a text messaging protocol, wired carrier medium 116 using an instant messaging protocol, wired medium 118 using a voice protocol, and wired medium 120 using an email protocol. It should be noted that different protocols may be used by each device and each device may use more than one protocol for communication. For example, cell phone 106 is shown in FIG. 1 transmitting a text message via wireless medium 114 using a text messaging protocol. Alternatively, cell phone 106 may transmit messages using an email protocol in addition to, or instead of, a text messaging protocol. Similarly, a device may use one or more mediums to transmit fragments. For example, IM client 108 may transmit fragments using a wired or wireless carrier medium.

In one embodiment, devices used to transmit and receive a plurality of encrypted message fragments may all be the same. For example, each of cell phones 106, 122, IM clients 108, 124, soft phones 110, 126, and email clients 112, 128 may be all cell phones. In this embodiment, each of the plurality of encrypted message fragments is transmitted across a carrier medium (e.g., wireless) via cell phones. In other embodiments, other combinations of devices, protocols, and carrier mediums may be used to transmit a plurality of encrypted message fragments from PC 104 to PC 130. The number of devices, protocols, and carrier mediums used to transmit a message may vary based on the required level of security.

In one embodiment, each of the encrypted message fragments is transmitted via one of a plurality of devices. For example, a message divided into ten fragments may be transmitted via five devices. Each of encrypted message fragments one through five may be transmitted via one of devices one through five. Similarly, fragments six through ten may be transmitted via one of devices one through five. As such, fragments one and six are transmitted via device one, fragments two and seven are transmitted via device two, etc. As shown in FIG. 1A, in one embodiment, fragments may be transmitted in a round-robin order. In other embodiments, a plurality of encrypted message fragments may be selected for transmission via a plurality of devices in one of a plurality of different orders. For example, each of the encrypted message fragments may be selected for transmission through each of the plurality of devices according to a different order such as consecutively numbered fragments being transmitted via a single device. In one embodiment, the selection of each of a plurality of encrypted message fragments for transmission via one of a plurality of devices is based on a random sequence. In one embodiment, each of the plurality of encrypted message fragments is selected for transmission via one of a plurality of devices based on one or more of the medium of the message, the size of the message, and the size of each of the plurality of encrypted message fragments. In one embodiment, the order and devices via which message fragments are transmitted is known by both the transmitting and receiving PCs 104, 130, in order to facilitate transmission and reassembly of the encrypted message.

As described above, a message is encrypted and divided into a plurality of encrypted message fragments for transmission across a plurality of devices, protocols, and carrier mediums. As such, someone electronically eavesdropping on transmissions via a single carrier medium would detect only portions of an encrypted message. As such, unauthorized person would not be able to read an encrypted message sent via the method shown in FIG. 2 by eavesdropping on a single carrier medium.

Figure 4:
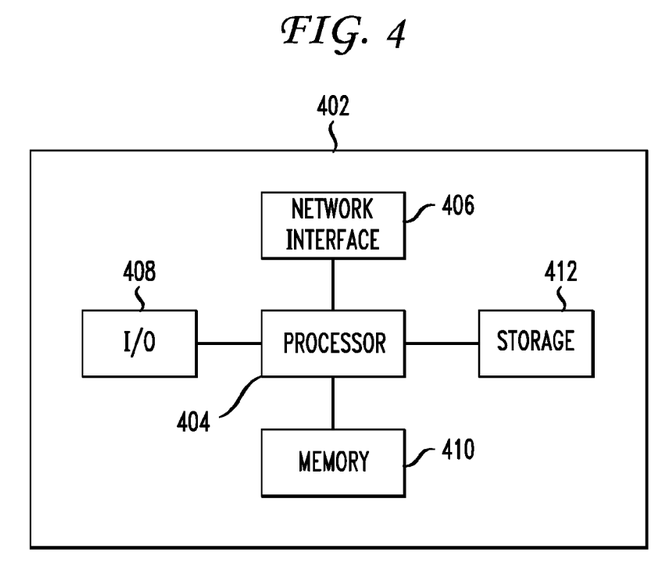
FIG. 4 depicts a high-level diagram of a computer for unified encrypted messaging according to an embodiment.

PCs 104, 130, cell phones 106, 122, IM clients 108, 124, soft phones 110, 126 and email clients 112, 128 may each be implemented on a computer. A high-level block diagram of such a computer is illustrated in FIG. 4. Computer 402 contains a processor 404 which controls the overall operation of the computer 402 by executing computer program instructions which define such operation. The computer program instructions may be stored in a storage device 412, or other computer readable medium (e.g., magnetic disk, CD ROM, etc.), and loaded into memory 410 when execution of the computer program instructions is desired. Thus, the method steps of FIGS. 2 and 3 can be defined by the computer program instructions stored in the memory 410 and/or storage 412 and controlled by the processor 404 executing the computer program instructions. For example, the computer program instructions can be implemented as computer executable code programmed by one skilled in the art to perform an algorithm defined by the method steps of FIGS. 2 and 3. Accordingly, by executing the computer program instructions, the processor 404 executes an algorithm defined by the method steps of FIGS. 2 and 3. The computer 402 also includes one or more network interfaces 406 for communicating with other devices via a network. The computer 402 also includes input/output devices 408 that enable user interaction with the computer 402 (e.g., display, keyboard, mouse, speakers, buttons, etc.) One skilled in the art will recognize that an implementation of an actual computer could contain other components as well, and that FIG. 4 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method comprising:
   dividing an encrypted message into a plurality of encrypted message fragments;
   transmitting, via a first device, a first portion of the plurality of encrypted message fragments via a first protocol; and
   transmitting, via a second device, a second portion of the plurality of encrypted message fragments via a second protocol, the first device being different from the second device and the first protocol being different from the second protocol.

2. The method of claim 1 wherein the first protocol and first device are associated with a first medium and the second protocol and second device are associated with a second medium, the first medium being different from the second medium.

3. The method of claim 1 wherein the dividing an encrypted message into a plurality of encrypted message fragments further comprises adding a message identifier and a fragment identifier to each of the plurality of encrypted message fragments.

4. The method of claim 3 further comprising:
   receiving the first portion of the plurality of encrypted message fragments via the first protocol;
   receiving the second portion of the encrypted message fragments via the second protocol; and
   assembling the encrypted message based on the first portion of the plurality of encrypted message fragments and the second portion of the plurality of fragments to generate a reassembled encrypted message.

5. The method of claim 4, wherein the assembling the encrypted message is further based on the message identifier and fragment identifier in each of the plurality of encrypted message fragments.

6. The method of claim 5, wherein the assembling the encrypted message further comprises removing the message identifier and fragment identifier from each of the plurality of encrypted message fragments.

7. An apparatus comprising:
   a processor; and
   a memory to store computer program instructions, the computer program instructions when executed on the processor cause the processor to perform operations comprising:
   dividing an encrypted message into a plurality of encrypted message fragments;
   transmitting, via a first device, a first portion of the plurality of encrypted message fragments via a first protocol; and
   transmitting, via a second device, a second portion of the plurality of encrypted message fragments via a second protocol, the first device being different from the second device and the first protocol being different from the second protocol.

8. The apparatus of claim 7 wherein the first protocol and first device are associated with a first medium and the second protocol and second device are associated with a second medium, the first medium being different from the second medium.

9. The apparatus of claim 7 wherein the dividing an encrypted message into a plurality of encrypted message fragments further comprises adding a message identifier and a fragment identifier to each of the plurality of encrypted message fragments.

10. The apparatus of claim 9, the operations further comprising:
    formatting the first portion of the plurality of encrypted message fragments to be transmitted via the first protocol based on the first protocol; and
    formatting the second portion of the plurality of encrypted message fragments to be transmitted via the second protocol based on the second protocol.

11. The apparatus of claim 7, wherein the dividing an encrypted message into a plurality of encrypted message fragments is based on a number of devices via which the plurality of encrypted message fragments are to be transmitted.

12. The apparatus of claim 11, wherein the dividing an encrypted message into a plurality of encrypted message fragments is further based on a number of the plurality of encrypted message fragments to be transmitted by each of the number of devices.

13. A computer readable storage device storing computer program instructions, which, when executed on a processor, cause the processor to perform operations comprising:
    dividing an encrypted message into a plurality of encrypted message fragments;
    transmitting, via a first device, a first portion of the plurality of encrypted message fragments via a first protocol; and
    transmitting, via a second device, a second portion of the plurality of encrypted message fragments via a second protocol, the first device being different from the second device and the first protocol being different from the second protocol.

14. The computer readable storage device of claim 13 wherein the first protocol and first device are associated with a first medium and the second protocol and second device are associated with a second medium, the first medium being different from the second medium.

15. The computer readable storage device of claim 13 wherein the dividing an encrypted message into a plurality of encrypted message fragments further comprises adding a message identifier and a fragment identifier to each of the plurality of encrypted message fragments.

16. The computer readable storage device of claim 15, the operations further comprising:
    formatting the first portion of the plurality of encrypted message fragments to be transmitted via the first protocol based on the first protocol; and
    formatting the second portion of the plurality of encrypted message fragments to be transmitted via the second protocol based on the second protocol.

17. The computer readable storage device of claim 13, wherein the dividing an encrypted message into a plurality of encrypted message fragments is based on a number of devices via which the plurality of encrypted message fragments are to be transmitted and a number of the plurality of encrypted message fragments to be transmitted by each of the number of devices.

\* \* \* \* \*